United States Patent
He et al.

(10) Patent No.: US 10,863,112 B1
(45) Date of Patent: Dec. 8, 2020

(54) SMOOTHING IMAGE TRANSITIONS WHEN CHANGING VIEWS

(71) Applicant: Plantronics, Inc., Santa Cruz, CA (US)

(72) Inventors: Wenxue He, Beijing (CN); Hai Xu, Beijing (CN); Lidan Qin, Beijing (CN); Yongkang Fan, Beijing (CN)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 16/584,609

(22) Filed: Sep. 26, 2019

(51) Int. Cl.
| | |
|---|---|
| *H04N 5/93* | (2006.01) |
| *H04N 5/262* | (2006.01) |
| *G06T 5/00* | (2006.01) |
| *H04N 5/232* | (2006.01) |
| *H04N 7/15* | (2006.01) |

(52) U.S. Cl.
CPC .......... *H04N 5/2628* (2013.01); *G06T 5/006* (2013.01); *H04N 5/23238* (2013.01); *H04N 7/15* (2013.01)

(58) Field of Classification Search
CPC .......... G11B 27/3081; G06K 9/00744; G06K 9/00765; H04N 21/2343; G06T 2207/10016
USPC .................... 348/36; 386/278, 280, 281, 282
See application file for complete search history.

(56) References Cited

U.S. PATENT DOCUMENTS

| | | | |
|---|---|---|---|
| 10,018,609 B2 * | 7/2018 | Miller | ................ G06K 9/00791 |
| 2015/0035973 A1 * | 2/2015 | Rammos | ................ G01B 11/14 348/140 |
| 2015/0058733 A1 * | 2/2015 | Novikoff | .............. G11B 27/038 715/723 |

* cited by examiner

*Primary Examiner* — Robert Chevalier
(74) *Attorney, Agent, or Firm* — Ferguson Braswell Fraser Kubasta, PC

(57) ABSTRACT

A method may include receiving a source video frame captured using a wide angle lens, deriving a characteristic of a target video frame from the source video frame, generating a transitional video frame using the source video frame and the target video frame, and transmitting the transitional video frame to an endpoint.

20 Claims, 10 Drawing Sheets

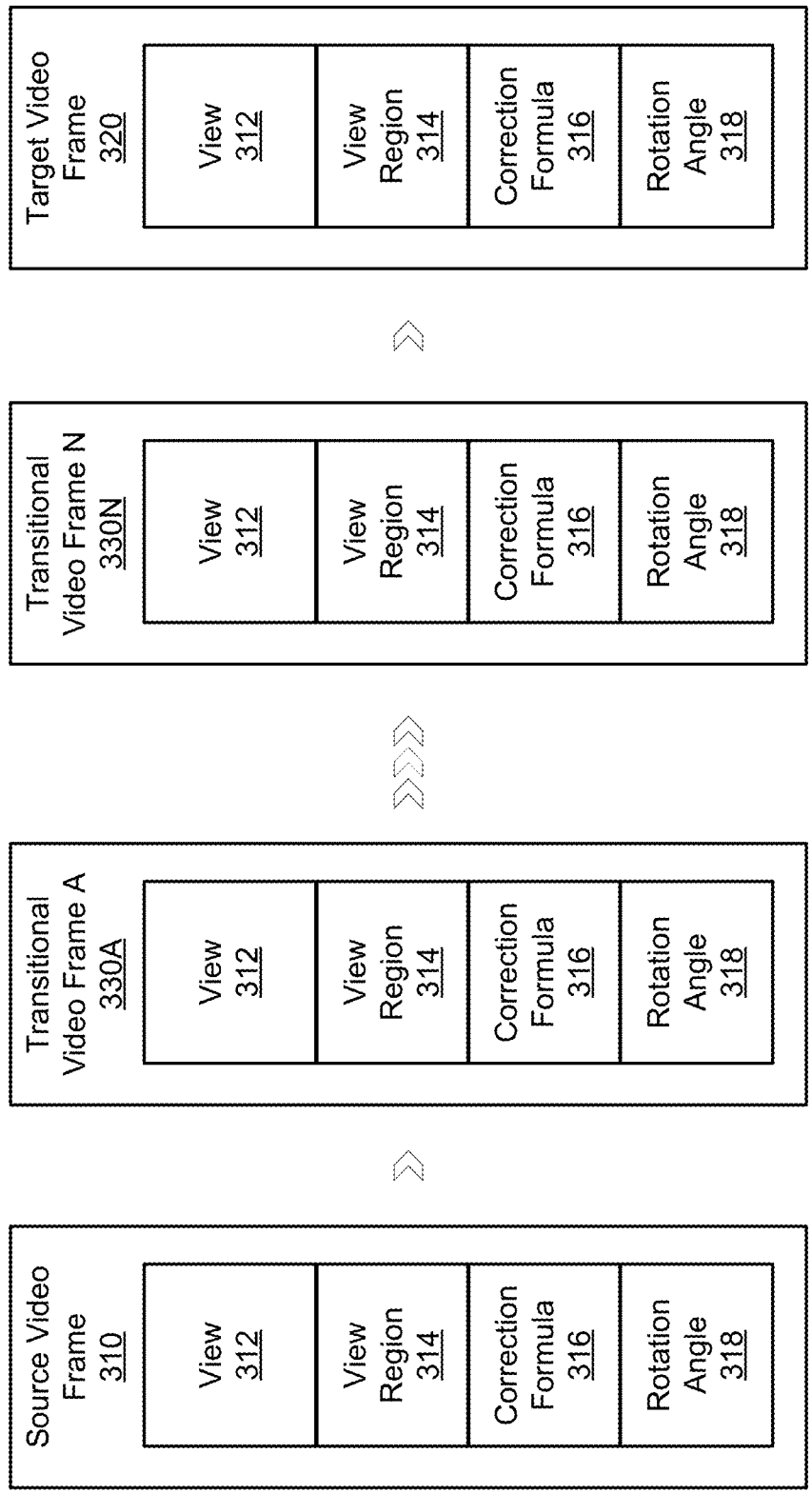

Mapping Table 370
| Line | Original Radius (radius = $\sqrt{x^2+y^2}$) | Corrected Radius (radius = $\sqrt{x'^2+y'^2}$) |
|---|---|---|
| 1 | 22.07555342 | 19.9984433 |
| 2 | 44.14140755 | 40.00517026 |
| 3 | 66.19974526 | 60.02825021 |
| 4 | 88.25274938 | 80.07552808 |
| 5 | ......... | ......... |
| 6 | 486.5696193 | 452.9110879 |
| 7 | 508.8542416 | 474.677515 |
| 8 | ......... | ......... |
| 9 | 2411.481481 | 3486.422469 |
FIG. 3C
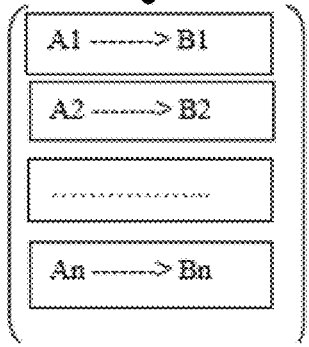
Source Mapping Table 382
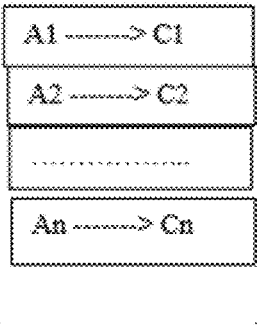
Target Mapping Table 384
$(1-W) *$ ... $+ W *$ ...
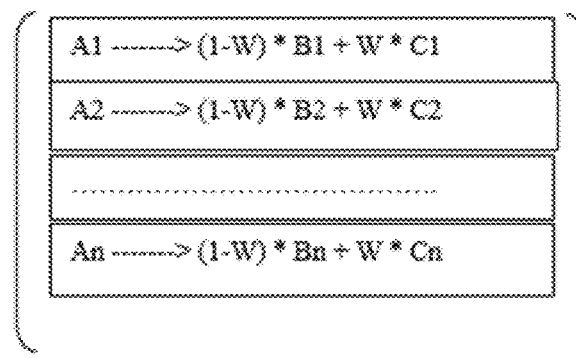
Transitional Mapping Table 386
FIG. 3D Source Video Frame A
(Room View)
500A Target Video Frame A
(Talker View)
502A Source Mapping Table 520

| Original Radius (radius = $\sqrt{x^2 + y^2}$) | Corrected Radius (radius = $\sqrt{x'^2 + y'^2}$) |
|---|---|
| 22.07555342 | 19.9984433 |
| 44.14140755 | 40.00517026 |
| 66.19974526 | 60.02825021 |
| 88.25274938 | 80.07553808 |
| ............ | ............ |
| 486.5696193 | 452.9110879 |
| 508.8542416 | 474.677515 |
| ............ | ............ |
| 2411.481481 | 3486.422469 |

Target Mapping Table 530

| Original Radius (radius = $\sqrt{x^2 + y^2}$) | Corrected Radius (radius = $\sqrt{x'^2 + y'^2}$) |
|---|---|
| 22.07555342 | 22.07555342 |
| 44.14140755 | 44.14140755 |
| 66.19974526 | 66.19974526 |
| 88.25274938 | 88.25274938 |
| ............ | ............ |
| 486.5696193 | 486.5696193 |
| 508.8542416 | 508.8542416 |
| ............ | ............ |
| 2411.481481 | 2411.481481 |

Transitional Mapping Table 540

| Original Radius (radius = $\sqrt{x^2 + y^2}$) | Corrected Radius (radius = $\sqrt{x'^2 + y'^2}$) |
|---|---|
| 22.07555342 | (1-w)* 19.9984433 + w * 22.07555342 |
| 44.14140755 | (1-w)* 40.00517026 + w *44.14140755 |
| ............ | ............ |
| 2411.481481 | (1-w)* 3486.422469 + w *2411.481481 |

FIG. 5C

SMOOTHING IMAGE TRANSITIONS WHEN CHANGING VIEWS

CROSS-REFERENCE TO RELATED APPLICATIONS

The present application includes subject matter related to PCT Application PCT/CN2018/0117141, filed Nov. 23, 2018, and entitled "Selective Distortion or Deformation Correction in Images from a Camera with a Wide Angle Lens." PCT/CN2018/0117141 is incorporated herein by reference in its entirety.

BACKGROUND

In videoconferencing, a single camera, such as a wide angle camera or panoramic camera, can be used to capture a view feed having multiple meeting participants, (a "room view"). A copy of the captured feed may be cropped to contain an enlarged view of a single person, such as a person who is talking or group of persons at an endpoint. Another copy of the captured feed may be cropped to include someone or something else. For example, a second copy may be for a person who was speaking before the person in first copy. The copies with the cropped images, being based on data captured by a wide angle curved lens, will be distorted and deformed when displayed on a flat surface. In addition, switching from one view (e.g., a "room view") to another view (e.g., a "talker view") while correcting for distortion or deformation may result in an abrupt, discontinuous transition, potentially degrading the user experience.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including receiving a source video frame captured using a wide angle lens, deriving a characteristic of a target video frame from the source video frame, generating a transitional video frame using the source video frame and the target video frame, and transmitting the transitional video frame to an endpoint.

In general, in one aspect, one or more embodiments relate to a system including a camera including a wide angle lens, a memory coupled to a computer processor, and a video module, executing on the computer processor and using the memory, configured to receive a source video frame captured using the wide angle lens, derive a characteristic of a target video frame from the source video frame, generate a transitional video frame using the source video frame and the target video frame, and transmit the transitional video frame to an endpoint.

In general, in one aspect, one or more embodiments relate to a non-transitory computer readable medium including instructions that, when executed by a computer processor, perform: receiving a source video frame captured using a wide angle lens, deriving a characteristic of a target video frame from the source video frame, generating a transitional video frame using the source video frame and the target video frame, and transmitting the transitional video frame to an endpoint.

Other aspects of the disclosure will be apparent from the following description and the appended claims.

BRIEF DESCRIPTION OF DRAWINGS

FIG. 3A and FIG. 3B show video frames in accordance with one or more embodiments of the invention.

FIGS. 3C and 3D show example correction formulas for video frames in accordance with one or more embodiments of the invention.

FIG. 5A, FIG. 5B, and FIG. 5C show examples in accordance with one or more embodiments of the invention.

DETAILED DESCRIPTION

Figure 1:
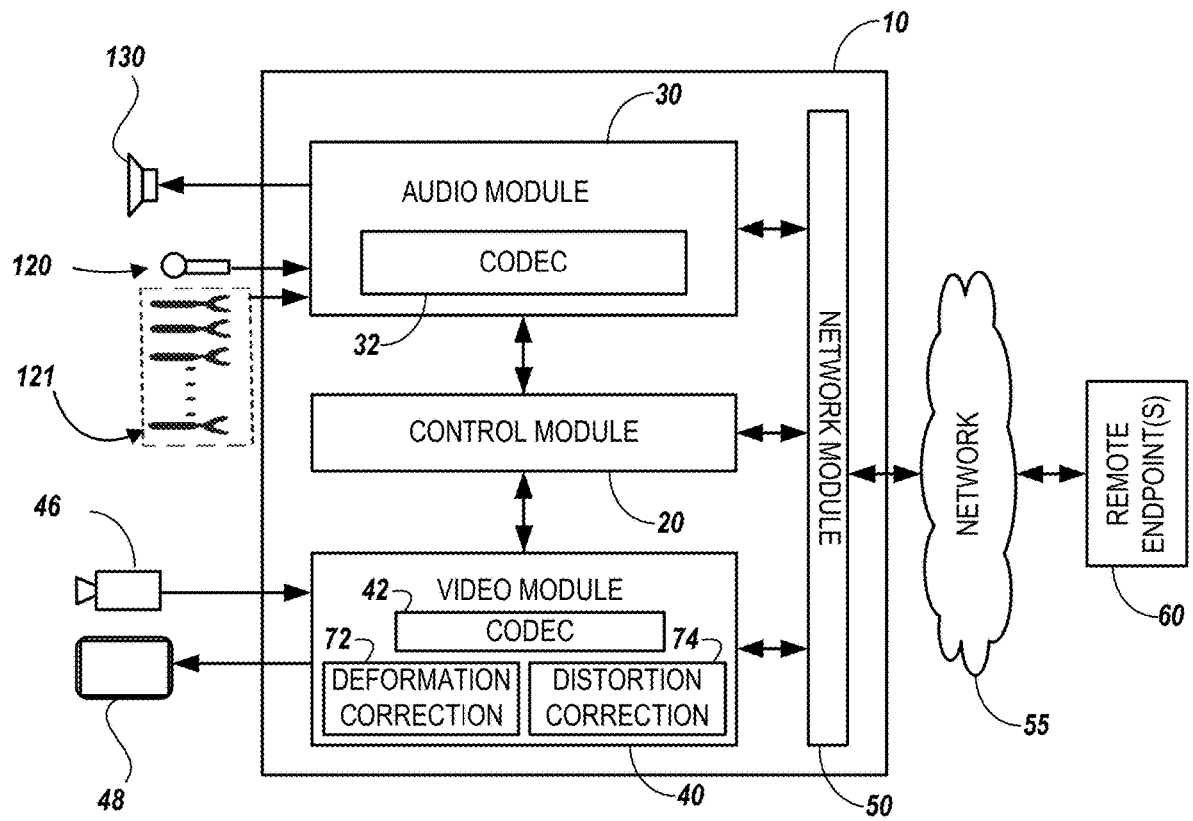
FIG. 1 shows an operational environment of embodiments of this disclosure.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, although the description includes a discussion of various embodiments of the disclosure, the various disclosed embodiments may be combined in virtually any manner. All combinations are contemplated herein.

In the drawings and the description of the drawings herein, certain terminology is used for convenience only and is not to be taken as limiting the embodiments of the present disclosure. In the drawings and the description below, like numerals indicate like elements throughout.

Images captured using a wide angle lens include distortion effects and deformation effects. As used herein, distortion refers to bending of light such that straight lines appear curved in an image. As used herein, deformation refers to "stretching" in a portion of an image such that objects appear larger in one or more dimensions than is natural. Distortion or deformation may be corrected in an image by applying a transformation to the image. However, distortion and deformation may not both be corrected in an image at the same time. Distortion and deformation may be relatively more noticeable in different views of an image. For example, in a cropped view of an image, deformation may be more noticeable than in a full view of the image. Further, deformation may be more noticeable at edges of the image as compared to the center. As used herein, rotation refers to a geometric transform which maps an input image onto an output image by rotating the input image through an angle about an origin. Disclosed are systems and methods for smoothly transitioning between images. While the disclosed systems and methods are described in connection with a teleconference system, the disclosed systems and methods may be used in other contexts according to the disclosure.

FIG. 1 illustrates a possible operational environment for example circuits of this disclosure. Specifically, FIG. 1 illustrates a conferencing apparatus or endpoint (10) in accordance with an embodiment of this disclosure. The conferencing apparatus or endpoint (10) of FIG. 1 communicates with one or more remote endpoints (60) over a network (55). The endpoint (10) includes an audio module (30) with an audio codec (32), and a video module (40) with a video codec (42). These modules (30, 40) operatively couple to a control module (20) and a network module (50). The modules (30, 40, 20, 50) include dedicated hardware, software executed by one or more processors, or a combination thereof. In some examples, the video module (40) corresponds to a graphics processing unit (GPU), software executable by the graphics processing unit, a central processing unit (CPU), software executable by the CPU, or a combination thereof. In some examples, the control module (20) includes a CPU, software executable by the CPU, or a combination thereof. In some examples, the network module (50) includes one or more network interface devices, a CPU, software executable by the CPU, or a combination thereof. In some examples, the audio module (30) includes, a CPU, software executable by the CPU, a sound card, or a combination thereof.

In general, the endpoint (10) can be a conferencing device, a videoconferencing device, a personal computer with audio or video conferencing abilities, or any similar type of communication device. The endpoint (10) is configured to generate near-end audio and video and to receive far-end audio and video from the remote endpoints (60). The endpoint (10) is configured to transmit the near-end audio and video to the remote endpoints (60) and to initiate local presentation of the far-end audio and video.

A microphone (120) captures audio and provides the audio to the audio module (30) and codec (32) for processing. The microphone (120) can be a table or ceiling microphone, a part of a microphone pod, an integral microphone to the endpoint, or the like. Additional microphones (121) can also be provided. Throughout this disclosure all descriptions relating to the microphone (120) apply to any additional microphones (121), unless otherwise indicated. The endpoint (10) uses the audio captured with the microphone (120) primarily for the near-end audio. A camera (46) captures video and provides the captured video to the video module (40) and codec (42) for processing to generate the near-end video. For each video frame (e.g., source video frame (310) of FIG. 3A) of near-end video captured by the camera (46), the control module (20) selects a view region (e.g., view region (314) of FIG. 3A), and the control module (20) or the video module (40) crops the video frame to the view region. In general, a video frame (i.e., frame) is a single still image in a video feed, that together with the other video frames form the video feed. The view region may be selected based on the near-end audio generated by the microphone (120) and the additional microphones (121), other sensor data, or a combination thereof. For example, the control module (20) may select an area of the video frame depicting a participant who is currently speaking as the view region. As another example, the control module (20) may select the entire video frame as the view region in response to determining that no one has spoken for a period of time. Thus, the control module (20) selects view regions based on a context of a communication session.

The camera (46) includes a wide angle lens. Due to the nature of wide angle lenses, video (and still images) captured by the camera (46) includes both distortion and deformation effects. The video module (40) includes deformation correction logic (72) and distortion correction logic (74). The video module (40) may also include rotation logic. In some examples, the deformation correction logic (72) and the distortion correction logic (74) correspond to mapping tables (e.g., mapping table (350) of FIG. 3B) that identify adjustments to make to images captured by the camera (46). The mapping tables may be based on properties of a lens of the camera (46), such as focal length, etc. For each video frame of video captured by the camera (46), the video module (40) selects the deformation correction logic (72) or the distortion correction logic (40) based on a size of a view region selected by the control module (20) for that video frame. The video module (40) then applies the correction logic to the view region of the video frame to generate a corrected near end video frame (e.g., target video frame (320) of FIG. 3A). The video module (40) may also apply the rotation logic to the view region of the video frame. Thus, each corrected and/or rotated near-end video frame corresponds to a potentially cropped and corrected version of a video frame. The corrected and/or rotated near end video frames taken together comprise corrected near-end video.

The endpoint (10) uses the codecs (32, 42) to encode the near-end audio and the corrected near-end video according to any of the common encoding standards, such as MPEG-1, MPEG-2, MPEG-4, H.261, H.263 and H.264. Then, the network module (50) outputs the encoded near-end audio and corrected video to the remote endpoints (60) via the network (55) using any appropriate protocol. Similarly, the network module (50) receives the far-end audio and video via the network (55) from the remote endpoints (60) and sends these to their respective codecs (32, 42) for processing. Eventually, a loudspeaker (130) outputs the far-end audio (received from a remote endpoint), and a display (48) outputs the far-end video. The display (48) also outputs the corrected near-end video in some embodiments.

Thus, FIG. 1 illustrates an example of a device that selectively corrects deformation or distortion in video captured by a camera with a wide angle lens. In particular, the device of FIG. 1 may operate according to one of the methods described further below with reference to FIG. 4A, FIG. 4B and FIG. 4C. As described below, these methods may improve video quality during a communication session.

Figure 2:
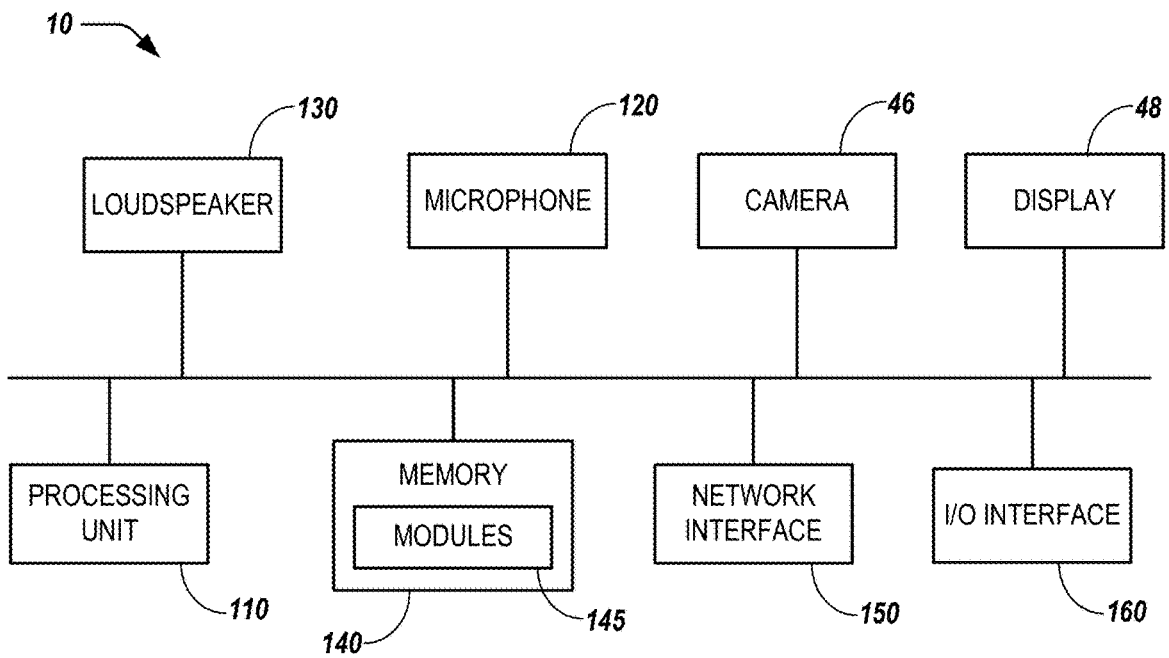
FIG. 2 shows components of the operational environment of FIG. 1.

FIG. 2 illustrates components of the conferencing endpoint of FIG. 1 in detail. The endpoint (10) has a processing unit (110), memory (140), a network interface (150), and a general input/output (I/O) interface (160) coupled via a bus (100). As above, the endpoint (10) has the base microphone (120), loudspeaker (130), the camera (46), and the display (48).

The processing unit (110) includes a CPU, a GPU, or both. The memory (140) can be any conventional memory such as SDRAM and can store modules (145) in the form of software and firmware for controlling the endpoint (10). The stored modules (145) include the various video and audio codecs (32, 42) and software components of the other modules (20, 30, 40, 50) discussed previously. Moreover, the modules (145) can include operating systems, a graphical user interface (GUI) that enables users to control the endpoint (10), and other algorithms for processing audio/video signals.

The network interface (150) provides communications between the endpoint (10) and remote endpoints (60). By contrast, the general I/O interface (160) can provide data transmission with local devices such as a keyboard, mouse, printer, overhead projector, display, external loudspeakers, additional cameras, microphones, etc.

As described above, the endpoint (10) captures video frames of video, crops the video frames to view regions, applies deformation or distortion correction to the view regions, and rotates the view regions. Thus, FIG. 2 illustrates an example physical configuration of a device that corrects deformation or distortion to enhance quality of a video.

FIG. 3A shows a source video frame (310), a target video frame (320), and transitional video frames (330A, 330N). In one or more embodiments, the source video frame (310), the target video frame (320), and transitional video frames (330A, 330N) are outputs of the video module (40) of FIG. 1. The source video frame (310), target video frame (320), and transitional video frames (330A, 330N) may be video frames of near-end video captured by the camera (46). The source video frame (310), target video frame (320), and transitional video frames (330A, 330N) may be corrected near end video frames (e.g., generated by the video module (40) of FIG. 1). The source video frame (310) may be used to derive one or more characteristics of the target video frame (320). For example, the source video frame (310) may be used to derive a view region (314) for the target video frame (320). The transitional video frames (330A, 330N) are designed to provide a series of smooth, gradual transitions between successive video frames of near-end video captured by the camera (46), starting with the source video frame (310) and ending with the target video frame (320).

In one or more embodiments, the source video frame (310), target video frame (320), and transitional video frames (330A, 330N) include a view (312), a view region (314), a correction formula (316), and a rotation angle (318). In one or more embodiments, the view (312) identifies a type of video frame based on the content of the video frame. For example, in a conferencing system, the view (312) may be a room view (e.g., containing multiple meeting participants in a conference room), a group view (e.g., containing a subset of multiple meeting participants), or a talker view (e.g., containing a single meeting participant who is speaking).

In one or more embodiments, the view region (314) is a cropped region of a camera generated video frame that is to be displayed. In other words, one or more cameras capture a camera generated video frame, such as a room view. As such, the camera generated video frame is the output of the camera(s) and may be a wide angle view. The view region is at least a portion of the camera generated video frame that is to be transmitted as a video frame for display. Thus, the view region may be the entire camera generated video frame, or only a portion of the camera generated video frame, such as a portion having a single participant or group of participants.

For example, the view region (314) corresponding to a talker view may encompass a single meeting participant, while excluding other meeting participants that would be in the camera generated video frame. The view region (314) may include a height, a width, and a center coordinate. The center coordinate may be expressed relative to the camera generated video frame. For example, the center coordinate may be (x, y), where x indicates the offset of the center of the view region (314) relative to the x-axis of the video frame, and y indicates the offset of the center of the view region (314) relative to the y-axis of the camera generated video frame. Alternatively, the center coordinate may be (r, theta), where is the radius by which the center of the view region (314) is offset relative to the center of the video frame, and theta is an angle by which the radius is rotated relative to the center of the camera generated video frame.

In one or more embodiments, the correction formula (316) is a formula that is applied to a video frame to transform the video frame to obtain the current video frame in a sequence of video frames from source video frame to target video frame. Specifically, the correction formula defines a weighting of the source video frame and the target video frame to obtain the current video frame. Thus, the set of correction formulas defines the transformations from the source video frame to the target video frame through a sequence of transitional video frame(s). Using the set of correction formulas to generate a sequence of video frames, changes are gradually applied.

Figure 3B:
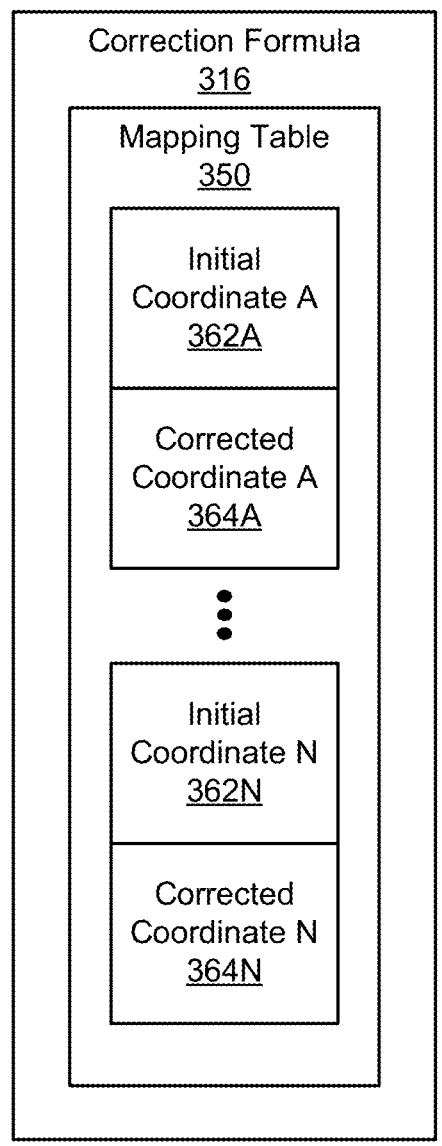

The correction formula (316) may implement distortion correction logic (74) and/or deformation correction logic (72). Turning to FIG. 3B, the correction formula (316) may be represented using a mapping table (350). In one or more embodiments, the mapping table (350) maps initial coordinates (362A, 362N) to corrected coordinates (364A, 364N). The initial coordinate (362A) is the location of a pixel in the current video frame. The initial coordinate (362A) maps to at least one corresponding corrected coordinate (364A) by the mapping table, and the corresponding corrected coordinate is the new location for the pixel that should be in the next video frame. Thus, the mapping table specifies, for a pixel having a particular color value, a new location for the pixel. The mapping table (350) may be used to speed up the calculation of the correction formula (316) since the result of the calculation may be obtained via a table lookup. For example, the mapping table (350) may be queried with an initial coordinate (362A) to obtain a corrected coordinate (364A). Rather than using a mapping table, the correction formula (316) may be a mathematical formula with parameters based on the number of transitional video frames.

FIG. 3C shows an example of a mapping table (370) that maps initial coordinates to corrected coordinates, where the coordinates are radii. In one or more embodiments, when a specific coordinate is not found in the table, then an interpolated coordinate may be calculated and used instead. For example, the mapping table (370) does not contain an initial radius of 500. A corrected radius may be calculated based on line 6 and line 7, whose initial radii (486 and 508) are closest to 500. Assume that the corrected radius is 466.038. If the ratio of y/x is assumed to be the same for both the initial and corrected coordinates, and the initial radius corresponds to an x-coordinate of 300 and a y-coordinate of 400, then the (x, y) coordinate corresponding to the corrected radius may be (280, 373).

FIG. 3D shows a source mapping table (382) for a source video frame, a target mapping table (384) for a target video frame, and a transitional mapping table (386) for a transitional video frame (330A). The transitional mapping table (386) may be generated by weighting the corresponding corrected coordinates in the source mapping table (382) and the target mapping table (384). The weight, W in FIG. 3D, may be the frame number of the transitional video frame (330A) within the sequence of transitional video frames (330A, 330N) divided by the total number of transitional video frames (330A, 330N). For example, in the transitional mapping table (386), the corrected coordinate in the source mapping table (382) may be weighted by 1-W, and the corrected coordinate in the target mapping table (384) may be weighted by W. Continuing this example, if there are 50 transitional video frames (330A, 330N), then the weight W corresponding to the fifteenth transitional video frame may be 15/50.

In one or more embodiments, the rotation angle (318) is an angle by which a view region (314) of a video frame is rotated, relative to an origin. The origin may be a center coordinate of the view region (314) relative to the video frame. For example, a source video frame (310) may be rotated by an angle A to transform the source video frame (310) into a target video frame (320). Continuing this example, the rotation from the source video frame (310) to the target video frame (320) may be achieved in K increments, via K transitional video frames, such that the rotation angle (318) for each transitional video frame is A/K. In one or more embodiments, rotating the video frame corrects distortion (e.g., curvature), particularly for pixels positioned far from the center of the camera generated video frame and/or near a diagonal line dividing the camera generated video frame.

Figure 4A:
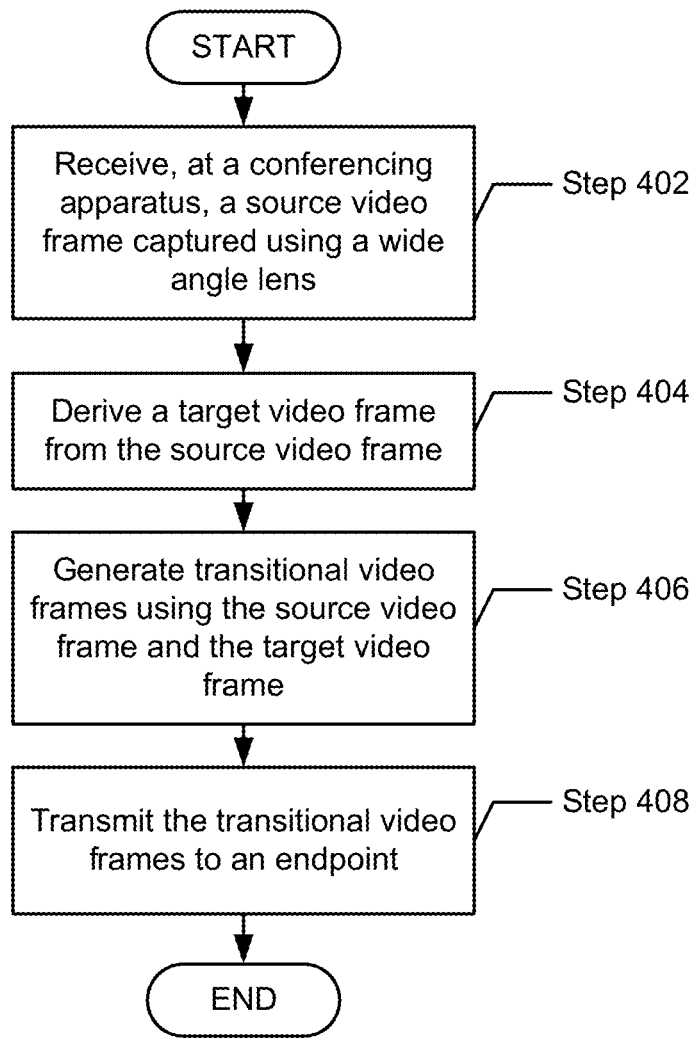
FIG. 4A, FIG. 4B, and FIG. 4C show flowcharts of methods in accordance with one or more embodiments of the invention.

FIG. 4A shows a flowchart in accordance with one or more embodiments of the invention. The flowchart depicts a process for smoothly transitioning between video frames. One or more of the steps in FIG. 4A may be performed by the components (e.g., the video module (40) and control module (20) of the conferencing apparatus (10)), discussed above in reference to FIG. 1 and FIG. 2. In one or more embodiments of the invention, one or more of the steps shown in FIG. 4A may be omitted, repeated, and/or performed in parallel, or in a different order than the order shown in FIG. 4A. Accordingly, the scope of the invention should not be considered limited to the specific arrangement of steps shown in FIG. 4A.

Initially, in Step 402, a source video frame is received. The source video frame may be captured using a wide angle lens. The source video frame may be received at a conferencing apparatus. The source video frame may be preprocessed, such as based on a current view being displayed.

In Step 404, one or more characteristics of a target video frame is derived from the source video frame. For example, a view region of the target video frame may be derived from a view region of the source video frame. Continuing this example, the view region of the source video frame may correspond to a talker view that may serve as a focal point for the target video frame (e.g., such that the view region may fill all or most of the target video frame).

In Step 406, one or more transitional video frames are generated using the source video frame and one or more characteristics of the target video frame. In one or more embodiments, the transitional video frames collectively implement a smooth, gradual transition between the source video frame to the target video frame. The transition between the source video frame to the target video frame may be divided into increments, such that each transitional video frame implements a portion of the transition between the source video frame to the target video frame. The transitional video frames may be generated as described with respect to FIG. 4B and the accompanying description below.

In at least some embodiments, the one or more transitional video frames are rotated to obtain one or more rotated transitional video frames. In one or more embodiments, the source video frame is rotated by an angle about an origin to transform the source video frame into the target video frame.

The transitional video frames may collectively implement a smooth, gradual rotation from the source video frame to the target video frame. The transitional video frames may be rotated as described with respect to FIG. 4C and the accompanying description below.

In Step 408, the transitional video frames are transmitted to an endpoint. The endpoint may be an endpoint that is remote with respect to the conferencing apparatus (e.g., accessible over a network). Alternatively, the endpoint may be local with respect to the conferencing apparatus endpoint (e.g., a display device).

Figure 4B:
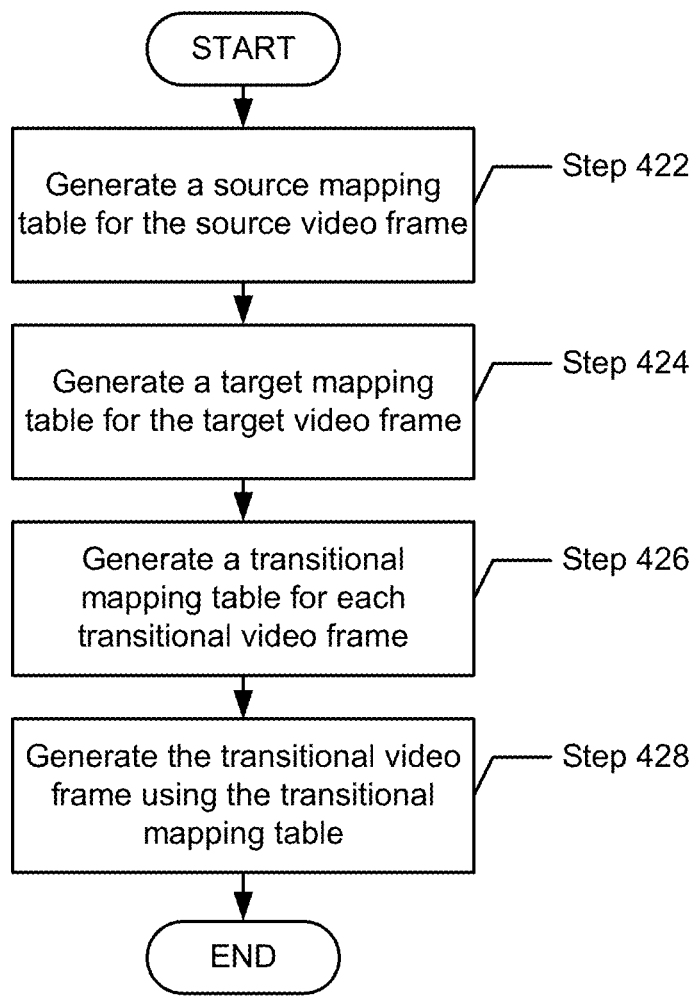

FIG. 4B shows a flowchart in accordance with one or more embodiments of the invention. The flowchart depicts a process for applying a correction to a video frame. One or more of the steps in FIG. 4B may be performed by the components (e.g., the video module (40) and control module (20) of the conferencing apparatus (10)), discussed above in reference to FIG. 1 and FIG. 2. In one or more embodiments of the invention, one or more of the steps shown in FIG. 4B may be omitted, repeated, and/or performed in parallel, or in a different order than the order shown in FIG. 4B. Accordingly, the scope of the invention should not be considered limited to the specific arrangement of steps shown in FIG. 4B.

Initially, in Step 422, a source mapping table is generated for the source video frame. In one or more embodiments, the source mapping table maps an initial source coordinate to a corrected source coordinate.

In Step 424, a target mapping table is generated for the target video frame. In one or more embodiments, the target mapping table maps an initial target coordinate to a corrected target coordinate. In one or more embodiments, the initial target coordinate may be the same as the corrected target coordinate (e.g., the target mapping table might not apply a correction).

In Step 426, a transitional mapping table is generated for each transitional video frame. In one or more embodiments, the transitional mapping table maps an initial transitional coordinate to a corrected transitional coordinate. The corrected transitional coordinate may be calculated as a weighted sum of the corresponding corrected source coordinate and the corresponding corrected target coordinate. That is, the corrected transitional coordinate may be calculated by applying a first weight to the corrected source coordinate and applying a second weight to the corrected target coordinate. The first weight and the second weight may be based on the number of transitional video frames. For example, the transitional mapping tables may correspond to a series of incremental corrections starting with the source video frame and resulting in the target video frame.

In Step 428, the transitional video frame is generated using the transitional mapping table. In one or more embodiments, each pixel in the image displayed in the transitional video frame is displayed at the corrected transitional coordinate calculated in Step 426 above.

Figure 4C:
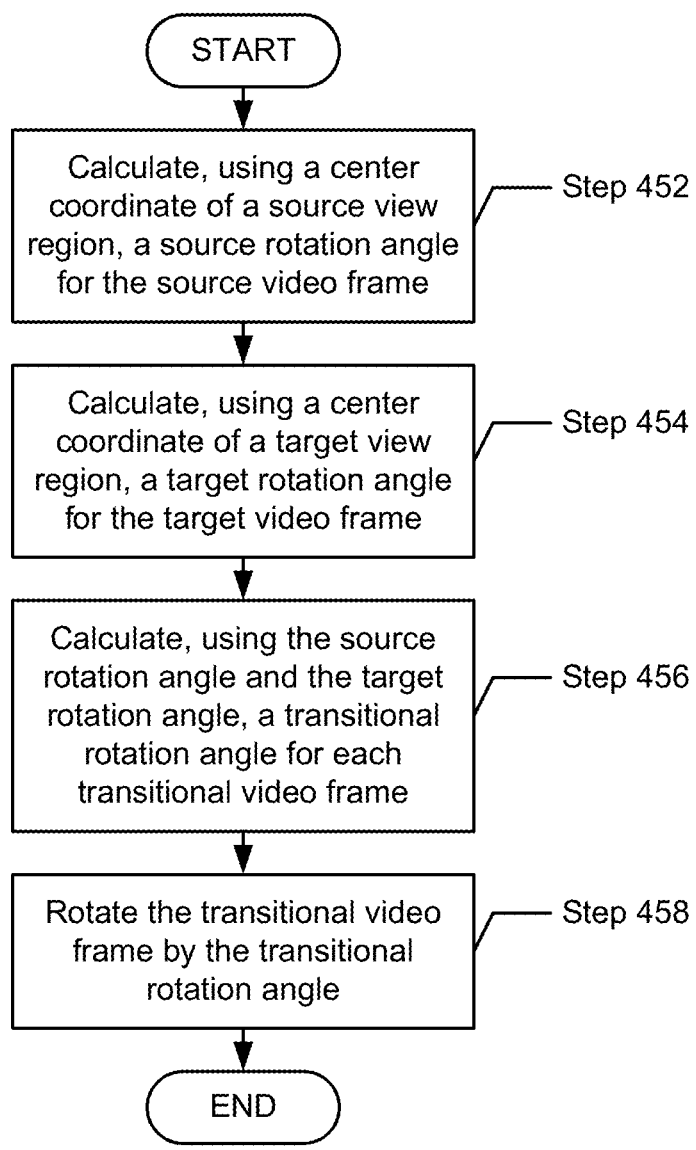

FIG. 4C shows a flowchart in accordance with one or more embodiments of the invention. The flowchart depicts a process for applying a rotation to a video frame. One or more of the steps in FIG. 4C may be performed by the components (e.g., the video module (40) and control module (20) of the conferencing apparatus (10)), discussed above in reference to FIG. 1 and FIG. 2. In one or more embodiments of the invention, one or more of the steps shown in FIG. 4C may be omitted, repeated, and/or performed in parallel, or in a different order than the order shown in FIG. 4C. Accordingly, the scope of the invention should not be considered limited to the specific arrangement of steps shown in FIG. 4C.

Initially, in Step 452, a source rotation angle for the source video frame is calculated, using a center coordinate of the source view region. The center coordinate of the source view region may be expressed relative to the source video frame. In one or more embodiments, the source rotation angle is based on the distance between the center coordinate of the source view region and the axes of the source video frame. For example, when the center coordinate of the source view region is on the x-axis or y-axis of the source video frame, then the source rotation angle for the source video frame may be zero. The source rotation angle may be greatest when the center coordinate of the source view region is closest to a corner of the source video frame.

In Step 454, a target rotation angle for the target video frame is calculated, using a center coordinate of the target view region (see description of Step 452 above).

In Step 456, a transitional rotation angle for the transitional video frame is calculated, using the source rotation angle and the target rotation angle. In one or more embodiments, the transitional rotation angle may be calculated by dividing the difference between the source rotation angle and the target rotation angle by the number of transitional video frames. The series of transitional rotation angles may correspond to a series of incremental rotations starting with the source rotation angle and resulting in the target rotation angle. For example, when the source video frame has a room view (e.g., a view spanning the entire conference room) and the target video frame has a talker view, the series of transitional video frames may incrementally perform the rotation from the room view to the talker view.

The rotation angle may be a maximum rotation angle multiplied by a factor between 0 and 1. In one or more embodiments, the maximum rotation angle is based on the wide angle lens of the camera. The maximum rotation angle may be determined experimentally. In one or more embodiments, the multiplicative factor depends on the center coordinate of the view region of the video frame relative to the height and width (e.g., the resolution) of the video frame. In one or more embodiments, the rotation angle is calculated using the following rotation angle formula:

MaximumRotationAngle*$|X|$/(width/2), when
$|Y/X|$>=height/width, and            Case 1:

MaximumRotationAngle*$|Y|$/(height/2), when
$|Y/X|$<height/width,            Case 2:

where X is the x-coordinate of center of the view region, and Y is the y-coordinate of center of the view region. $|X|$ refers to the absolute value of X and $|Y|$ refers to the absolute value of Y.

When the x-value or the y-value of the center coordinate of the view region is zero, then the rotation angle may be zero (e.g., no rotation is applied). That is, when the center coordinate of the view region coincides with the x-axis or y-axis of the video frame, then the rotation angle may be zero. For example, a source video frame whose view is a room view may have a view region whose center coordinate coincides with the center coordinate of the source video frame (e.g., the view region's center coordinate is (0, 0)), and therefore the rotation angle may be zero. In contrast, when the center coordinate of the view region is near a corner of the video frame, then the rotation angle may be close to the maximum rotation angle. For example, a target video frame with a talker view may have a view region whose center coordinate contains nonzero x- and y-coordinates, and therefore the rotation angle may be calculated by the above formula. In one or more embodiments, Case 1 and Case 2 above correspond to the scenarios in which the center coordinate of the view region is above or below a diagonal line dividing the quadrant of the video frame that contains the view region.

In one or more embodiments, the transitional rotation angle may be calculated separately for each coordinate, instead of calculating a constant rotation angle throughout the view region of the transitional video frame. For example, the transitional rotation angle for a coordinate may be based on the distance of the coordinate to the center coordinate of the view region. In one or more embodiments, the video module or the control module may include a graphical processing unit (GPU) to improve the performance of calculating a separate rotation angle for each coordinate.

In Step 458, the transitional video frame is rotated by the transitional rotation angle. In one or more embodiments, the rotation is applied to a corrected transitional video frame (e.g., resulting from Step 428 above).

Figure 5A:
Figure 5A:
Figure 5B:

FIG. 5A, FIG. 5B, and FIG. 5C show an implementation example(s) in accordance with one or more embodiments. The implementation example(s) are for explanatory purposes only and not intended to limit the scope of the invention. One skilled in the art will appreciate that implementation of embodiments of the invention may take various forms and still be within the scope of the invention.

FIG. 5A shows source video frame A (500A) ((310) in FIG. 3A) with a room view, and target video frame A (502A) ((320) in FIG. 3A) with a talker view. The image displayed in target video frame A (502A) represents a portion of the image displayed in source video frame A (500A). The transition from source video frame A (500A) to target video frame A (502A) occurs directly, via a single transition, and thus is an abrupt transition. In contrast, FIG. 5B illustrates a smooth transition from source video frame B (500B) to target video frame B (502B) via transitional video frames (510A, 510N) ((330A, 330N) in FIG. 3A).

FIG. 5C shows a source mapping table (520) ((350) in FIG. 3B and (370) in FIG. 3C) that maps initial radii to corrected radii for source video frame B (500B), and a target mapping table (530) that maps initial radii to corrected radii for target video frame B (502B). FIG. 5C also shows a transitional mapping table (540) that maps initial radii to corrected radii for transitional video frames (510A, 510N). The corrected radius for transitional video frames (510A, 510N) is calculated by adding the result of multiplying a weight 1-W by the initial radius of the source mapping table (520) and the result of multiplying a weight W by the corresponding initial radius of the target mapping table (530). W is the video frame number of the transitional video frame within the sequence of transitional video frames divided by the total number of transitional video frames. In this example, although only two transitional video frames (510A, 510N) are shown, there are a total of 100 transitional video frames. Thus, the corrected radius for transitional video frame number 15 is calculated by adding the result of multiplying a weight of 1-W=0.85 by the initial radius of the source mapping table (520) and the result of multiplying a weight W=0.15 by the corresponding initial radius of the target mapping table (530). Assuming a display rate of 30 frames per second, the displaying the sequence of 100 transitional video frames will take 3.33 seconds.

The view region for source video frame B (500B) encompasses the entirety of source video frame B (500B). Thus, the rotation angle for source video frame B (500B) is zero because the center coordinate of the view region for source video frame B (500B) is (0, 0). The center coordinate of the view region for source video frame B (500B) is the same as the center coordinate of source video frame B (500B).

In contrast, the center coordinate of the view region for target video frame B (502B) is offset from the center coordinate of target video frame B (502B). The height and length of target video frame B (502B) are 2160 and 3840, respectively. The height and length of the view region for target video frame B (502B) are 1280 and 960, respectively. Specifically, the view region for target video frame B (502B) is a portion of target video frame B (502B) that includes the talker. The center coordinate of the view region for target video frame B (502B) is (X=1379.5, Y=−380.5). The maximum rotation angle is 5 degrees. The rotation angle for target video frame B (502B) is calculated as MaximumRotationAngle*|Y|/(height/2)=5*380.5/(2160/2) =1.76. Case 2 of the rotation angle formula described in Step 456 above is used to calculate the rotation angle for target video frame B (502B) since |Y/X|<height/width. Thus, during the smooth transition from source video frame B (500B) to target video frame B (502B), the rotation angle must change from 0 to 1.76 degrees. If the smooth transition is achieved via 100 transitional video frames, then the rotation angle will be 0.0176 in the first transitional video frame, the rotation angle will be 0.0352 in the second transitional video frame, etc.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   receiving a source video frame captured using a wide angle lens;
   deriving a characteristic of a target video frame from the source video frame;
   generating a transitional video frame using the source video frame and the characteristic of the target video frame; and
   transmitting the transitional video frame to an endpoint.

2. The method of claim 1, wherein generating the transitional video frame comprises:
   applying a correction formula to the transitional video frame.

3. The method of claim 2, wherein applying the correction formula to the transitional video frame comprises:
   generating a source mapping table that maps, for the source video frame, an initial source coordinate to a corrected source coordinate;
   generating a target mapping table that maps, for the target video frame, an initial target coordinate to a corrected target coordinate;
   generating, using the source mapping table and the target mapping table, a transitional mapping table that maps, an initial transitional coordinate to a corrected transitional coordinate; and
   generating the transitional video frame using the transitional mapping table.

4. The method of claim 3, wherein generating the transitional mapping table comprises:
   calculating the corrected transitional coordinate by applying a first weight to the corrected source coordinate and applying a second weight to the corrected target coordinate, wherein the first weight and the second weight are based on a number of transitional video frames generated between the source video frame and the target video frame.

5. The method of claim 1, wherein the source video frame comprises a source view region, wherein the target video frame comprises a target view region, and wherein the method further comprises:
   calculating, using a center coordinate of the source view region, a source rotation angle for the source video frame;
   calculating, using a center coordinate of the target view region, a target rotation angle for the target video frame;
   calculating, using the source rotation angle and the target rotation angle, a transitional rotation angle for the transitional video frame; and
   rotating the transitional video frame by the transitional rotation angle.

6. The method of claim 5, wherein the target rotation angle is based on a distance between a coordinate of the target view region and a center coordinate of the target video frame.

7. The method of claim 5, wherein the transitional rotation angle is based on a number of transitional video frames generated between the source video frame and the target video frame.

8. A system, comprising:
   a camera including a wide angle lens;
   a memory coupled to a computer processor; and
   a video module, executing on the computer processor and using the memory, configured to:
   receive a source video frame captured using the wide angle lens,
   derive a characteristic of a target video frame from the source video frame,
   generate a transitional video frame using the source video frame and the characteristic of the target video frame, and
   transmit the transitional video frame to an endpoint.

9. The system of claim 8, wherein the video module is further configured to:
   apply a correction formula to the transitional video frame.

10. The system of claim 9, wherein the video module is further configured to apply the correction formula to the transitional video frame by:
    generating a source mapping table that maps, for the source video frame, an initial source coordinate to a corrected source coordinate;
    generating a target mapping table that maps, for the target video frame, an initial target coordinate to a corrected target coordinate;
    generating, using the source mapping table and the target mapping table, a transitional mapping table that maps, for the transitional video frame, an initial transitional coordinate to a corrected transitional coordinate; and generating the transitional video frame using the transitional mapping table.

11. The system of claim 10, wherein the video module is further configured to generate the transitional mapping table by:
    calculating the corrected transitional coordinate by applying a first weight to the corrected source coordinate and applying a second weight to the corrected target coordinate, wherein the first weight and the second weight are based on a number of transitional video frames generated between the source video frame and the target video frame.

12. The system of claim 8, wherein the source video frame comprises a source view region, wherein the target video frame comprises a target view region, and wherein the video module is further configured to:
    calculate, using a center coordinate of the source view region, a source rotation angle for the source video frame;
    calculate, using a center coordinate of the target view region, a target rotation angle for the target video frame;
    calculate, using the source rotation angle and the target rotation angle, a transitional rotation angle for the transitional video frame; and
    rotate the transitional video frame by the transitional rotation angle.

13. The system of claim 12, wherein the target rotation angle is based on a distance between a coordinate of the target view region and a center coordinate of the target video frame.

14. The system of claim 12, wherein the transitional rotation angle is based on a number of transitional video frames generated between the source video frame and the target video frame.

15. A non-transitory computer readable medium comprising instructions that, when executed by a computer processor, perform:
    receiving a source video frame captured using a wide angle lens;
    deriving a characteristic of a target video frame from the source video frame;
    generating a transitional video frame using the source video frame and the characteristic of the target video frame; and
    transmitting the transitional video frame to an endpoint.

16. The non-transitory computer readable medium of claim 15, wherein generating the transitional video frame comprises:
    applying a correction formula to the transitional video frame.

17. The non-transitory computer readable medium of claim 16, wherein applying the correction formulas to the transitional video frame comprises:
    generating a source mapping table that maps, for the source video frame, an initial source coordinate to a corrected source coordinate;
    generating a target mapping table that maps, for the target video frame, an initial target coordinate to a corrected target coordinate;
    generating, using the source mapping table and the target mapping table, a transitional mapping table that maps, for the transitional video frame, an initial transitional coordinate to a corrected transitional coordinate; and
    generating the transitional video frame using the transitional mapping table.

18. The non-transitory computer readable medium of claim 17, wherein generating the transitional mapping table comprises:
    calculating the corrected transitional coordinate by applying a first weight to the corrected source coordinate and applying a second weight to the corrected target coordinate, wherein the first weight and the second weight are based on a number of transitional video frames generated between the source video frame and the target video frame.

19. The non-transitory computer readable medium of claim 15, wherein the source video frame comprises a source view region, wherein the target video frame comprises a target view region, and wherein the instructions further perform:
    calculating, using a center coordinate of the source view region, a source rotation angle for the source video frame;
    calculating, using a center coordinate of the target view region, a target rotation angle for the target video frame;
    calculating, using the source rotation angle and the target rotation angle, a transitional rotation angle for the transitional video frame; and
    rotating the transitional video frame by the transitional rotation angle.

20. The non-transitory computer readable medium of claim 19, wherein the target rotation angle is based on a distance between a coordinate of the target view region and a center coordinate of the target video frame.

* * * * *